United States Patent
Rice et al.

(10) Patent No.: US 9,162,442 B2
(45) Date of Patent: Oct. 20, 2015

(54) IMAGE FORMING SYSTEM AND METHODS THEREOF

(75) Inventors: Huston W Rice, Vancouver, WA (US); David B Novak, Philomath, OR (US); Erik D Ness, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/345,380

(22) PCT Filed: Sep. 23, 2011

(86) PCT No.: PCT/US2011/052969
§ 371 (c)(1),
(2), (4) Date: Mar. 17, 2014

(87) PCT Pub. No.: WO2013/043188
PCT Pub. Date: Mar. 28, 2013

(65) Prior Publication Data
US 2014/0347419 A1 Nov. 27, 2014

(51) Int. Cl.
*B41J 29/38* (2006.01)
*B41J 2/045* (2006.01)
*B41J 2/365* (2006.01)
*G01K 13/00* (2006.01)

(52) U.S. Cl.
CPC ............... *B41J 2/0451* (2013.01); *B41J 2/365* (2013.01); *B41J 29/38* (2013.01); *G01K 13/00* (2013.01)

(58) Field of Classification Search
USPC .................. 347/5, 9, 10, 12, 17, 19
See application file for complete search history.

(56) References Cited

U.S. PATENT DOCUMENTS

| | | | |
|---|---|---|---|
| 5,231,423 A | 7/1993 | Wataya et al. | |
| 6,305,776 B1 | 10/2001 | Ohshima et al. | |
| 6,733,103 B2 | 5/2004 | Murata | |
| 2002/0027574 A1* | 3/2002 | Kao et al. | 347/17 |
| 2009/0002426 A1 | 1/2009 | Jung et al. | |
| 2010/0014885 A1 | 1/2010 | Domhoff et al. | |
| 2010/0165023 A1* | 7/2010 | Suzuki | 347/10 |
| 2011/0122186 A1 | 5/2011 | Lebron et al. | |

FOREIGN PATENT DOCUMENTS

| | | |
|---|---|---|
| JP | 08-216407 A | 8/1996 |
| JP | 2002-347223 A | 12/2002 |
| JP | 2006-103281 A | 4/2006 |

OTHER PUBLICATIONS

PCT Search Report and Written Opinion ~ Application No. PCT/US2011/052969, mailed May 4, 2012, pp. 8.

* cited by examiner

*Primary Examiner* — Lam Nguyen
(74) *Attorney, Agent, or Firm* — Hewlett-Packard Patent Department

(57) ABSTRACT

An image forming system and methods are disclosed. The methods include detecting an ambient temperature of an image forming system by a first thermal sense resistor disposed in a first printhead to obtain a first detected ambient temperature, detecting the ambient temperature of the image forming system by a second thermal sense resistor disposed in a second printhead to obtain a second detected ambient temperature, and determining a temperature difference between the first detected ambient temperature and the second detected ambient temperature of the image forming system by a temperature variation module.

15 Claims, 7 Drawing Sheets

IMAGE FORMING SYSTEM AND METHODS THEREOF

BACKGROUND

Image forming systems such as inkjet printing systems may include a plurality of printheads to form images on media and motors to perform motion functions of the image forming systems. The printheads may include thermal sense resistors to detect temperature of the respective printheads. A control module may control motion functions of the image forming systems based on detected temperatures of the printheads.

BRIEF DESCRIPTION OF THE DRAWINGS

Non-limiting examples are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

DETAILED DESCRIPTION

Figure 1:
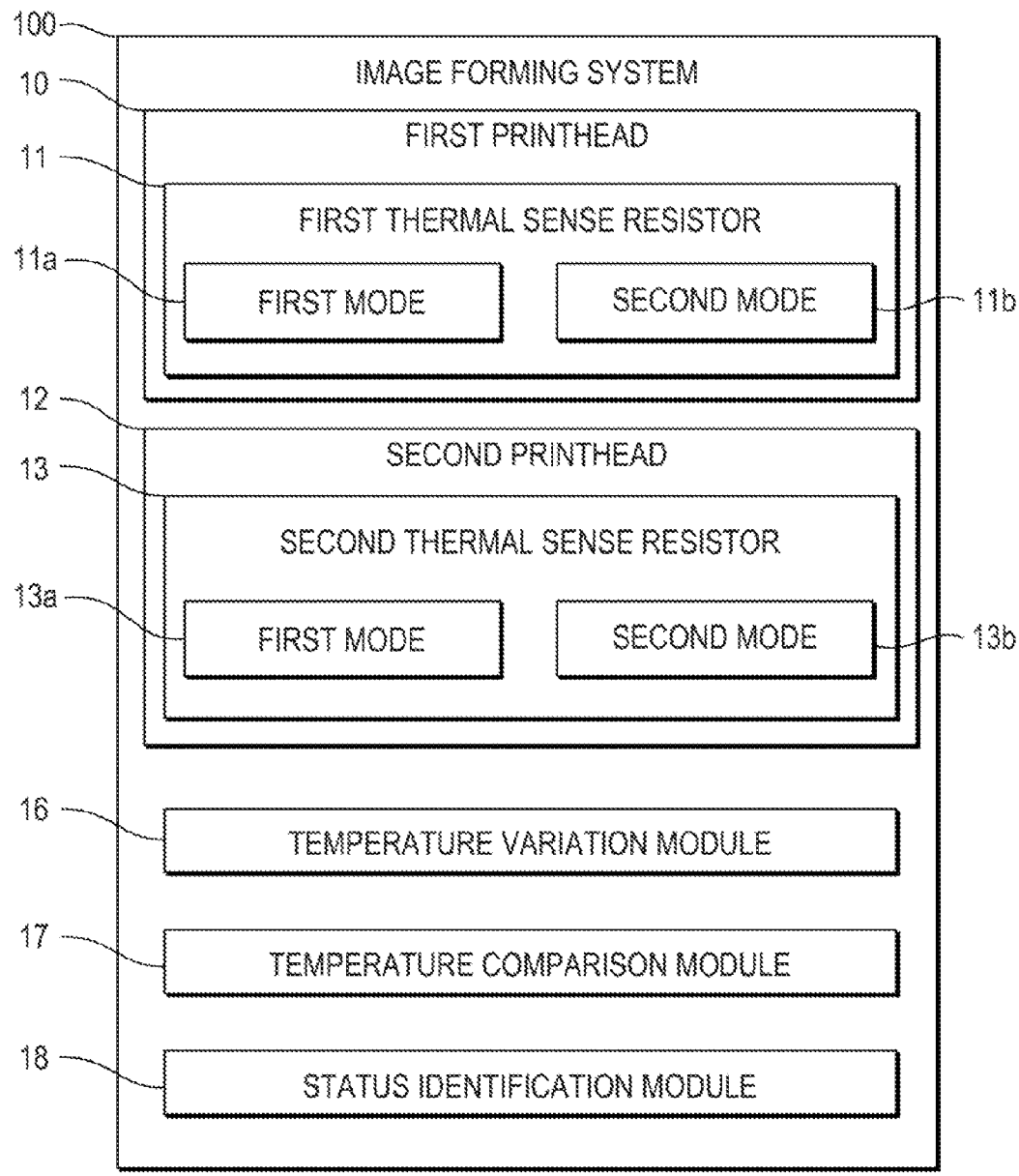
FIG. 1 is a block diagram illustrating an image forming system according to an example.

Image forming systems such as inkjet printing systems may include a plurality of printheads to form images on media and motors to perform motion functions of the image forming systems. The image forming systems, for example, may be an inkjet printing system such as a digital copier, printer, bookmaking machine, facsimile machine, multi-function machine, and the like. The printheads may include integrated printheads having thermal sense resistors to detect the temperature of the respective printheads. That is, the integrated printheads may include an ink supply therein. For example, the image forming system may include one printhead containing black ink and an other printhead containing cyan, magenta and yellow ink. A control module may control motion functions of the image forming systems based on the detected temperatures of the printheads. Periodically, however, one of the printheads may become defective and result in providing incorrect temperature detection of the respective printhead. For example, the printhead may sustain electrical damage and include programming errors such as having erroneous thermal sense resistor calibration values stored therein which may result in providing an incorrect temperature detection of the respective printhead. That is, the detected temperature may be lower than the actual temperature allowing power to be continually provided to the motors in an overheated state resulting in motor damage. Alternatively, the detected temperature may be higher than the actual temperature allowing power to the motors to be limited reducing the throughput of the image forming system unnecessarily.

In examples, the image forming system includes, amongst other things, a first printhead including a first thermal sense resistor to detect the ambient temperature of the image forming system to obtain a first detected ambient temperature, a second printhead including a second thermal sense resistor to detect the ambient temperature to obtain a second detected ambient temperature, a temperature variation module to determine a temperature difference between the first detected ambient temperature and the second detected ambient temperature, a temperature comparison module to compare the temperature difference with a temperature parameter, and a status identification module to identify whether at least one of the first printhead and the second printhead is a defective candidate based on a resultant comparison by the temperature comparison module. Based on identification of a printhead being a defective candidate, the respective printhead may be replaced. Further, the ambient temperature detected by the respective printhead identified as a defective candidate may not be deemed trusted. That is, the detected ambient temperature may not obtain a trusted status. A defective candidate may be a respective printhead having a thermal sense resistor which detected an ambient temperature outside of a range of the detected ambient temperature by a thermal sense resistor of an other printhead.

Figure 2:
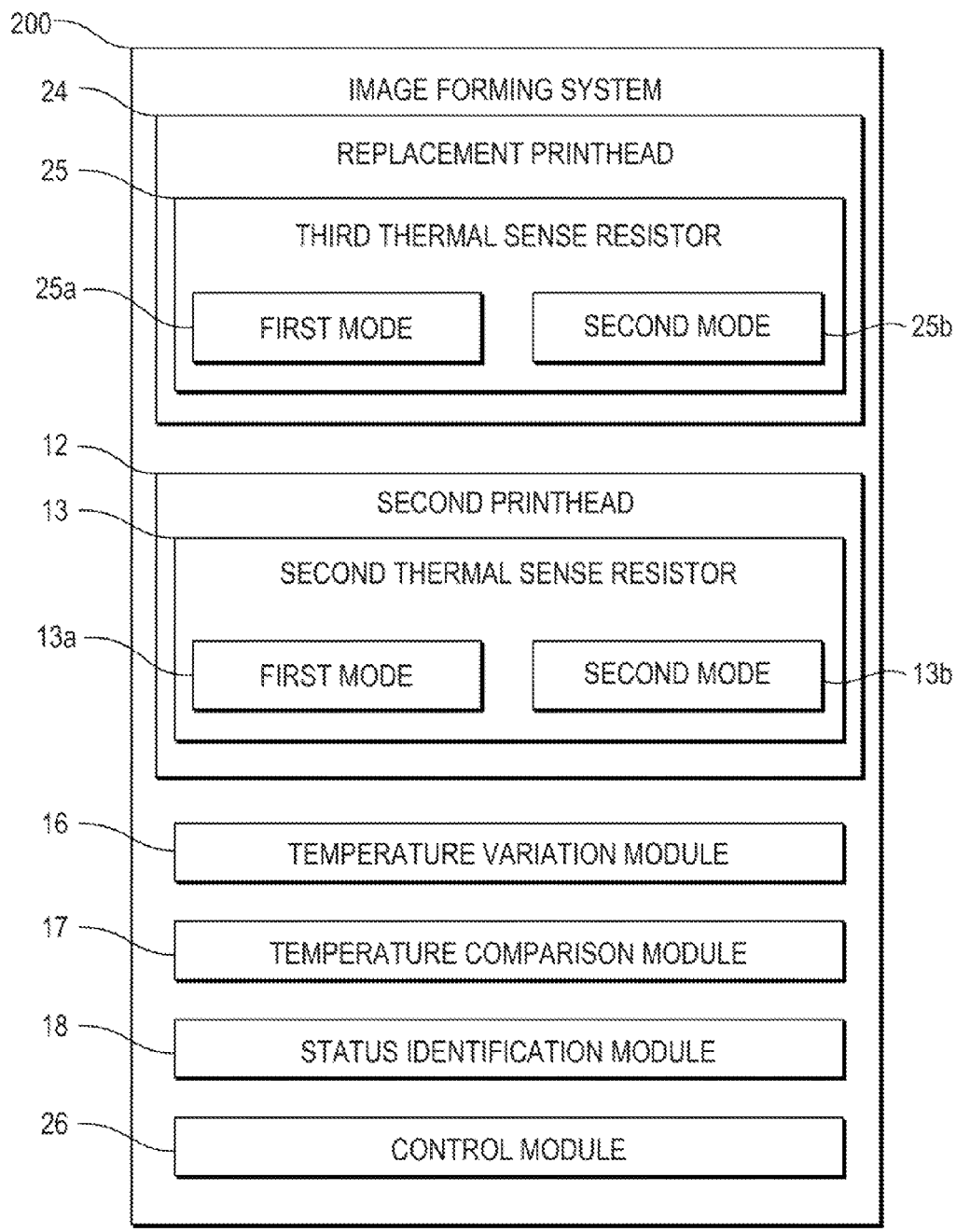
FIG. 2 is a block diagram illustrating the image forming system of FIG. 1 according to an example.

FIG. 1 is a block diagram illustrating an image forming system according to an example. FIG. 2 is a block diagram illustrating the image forming system of FIG. 1 according to an example. Referring to FIGS. 1 and 2, in some examples, an image forming system 100 includes a first printhead 10, a second printhead 12, a temperature variation module 16, a temperature comparison module 17, and a status identification module 18. The first printhead 10 includes a first thermal sense resistor 11 having a first mode 11a to detect a temperature of the first printhead 10 and a second mode 11b to detect an ambient temperature of the image forming system 100 to obtain a first detected ambient temperature. The second printhead 12 includes a second thermal sense resistor 13 having a first mode 13a to detect a temperature of the second printhead 12 and a second mode 13b to detect the ambient temperature of the image forming system 100 to obtain a second detected ambient temperature. In some examples, the respective ambient temperatures may be detected by the respective thermal sense resistors 11 and 13 of the respective printheads 10 and 12 after the respective printheads are idle for a predetermined period of time such as thirty minutes. That is, the predetermined period of time may correspond to a sufficient amount of time for the respective printheads 10 and 12 to cool to the surrounding ambient temperature, unless the respective printheads 10 and 12 are defective. In some examples, the thermal sense resistors 11 and 13 may be embedded in the printhead silicon of the respective printheads 10 and 12.

Referring to FIGS. 1 and 2, in some examples, the temperature variation module 16 may determine a temperature difference between the first detected ambient temperature and the second detected ambient temperature of the image forming system 100. The temperature comparison module 17 may compare the temperature difference with a temperature parameter. In some examples, the temperature parameter may be in a predetermined range of three to eight degrees Celsius. For example, in one example, the temperature parameter may be eight degrees Celsius. In another example, the temperature parameter may be two degrees Celsius. In some other examples, the temperature parameter may be in a predetermined range other than three to eight degrees Celsius. In some examples, the temperature comparison may be used to prevent motor damage and/or adjust printer behavior for ambient extreme temperatures. The status identification module 18 may identify whether at least one of the first printhead 10 and the second printhead 12 is a defective candidate based on a resultant comparison by the temperature comparison module 17. That is, generally the first detected ambient temperature and the second detected ambient temperature should not vary substantially when the first and second printhead 10 and 12 are not defective.

Referring to FIGS. 1 and 2, in some examples, the status identification module 18 may identify at least one of the first printhead 10 and the second printhead 12 as a defective candidate based on the resultant comparison corresponding to the temperature difference being at least one of equal to and greater than the temperature parameter. Alternatively, the status identification module 18 may assign a non-defective status to the first printhead 10 and the second printhead 12 based on the resultant comparison corresponding to the temperature difference being less than the temperature parameter. For example, assigning a non-defective status may include storing the non-defective status corresponding to the respective printhead 10 and 12 in firmware, and the like, and/or alerting the user thereof. The image forming system 100 may also include a replacement printhead 24 and a control module 26. The replacement printhead 24 may replace at least one of the first printhead 10 and the second printhead 12 determined to be a defective candidate by the status identification module 18. The replacement printhead 24 may include a third thermal sense resistor 25 having a first mode 25a to detect a temperature of the replacement printhead 24 and a second mode 25a to detect the ambient temperature of the image forming system 100 to obtain a third detected ambient temperature.

Referring to FIGS. 1 and 2, in some examples, the status identification module 18 may also identify whether the replacement printhead 24 is a defective candidate. The control module 26 may control a motion function of the image forming system 100, based on a respective detected temperature of at least one of the first printhead 10 and the second printhead 12. In some examples, the control module 26 may limit power to motors of the image forming system 100, for example, to stop and/or delay motion functions of the image forming system 100 if the respective temperature of the respective printheads 10 and 12 and/or an average temperature therebetween is at least one of equal to and above a predetermined temperature. In some examples, a respective detected temperature by a thermal sense resistor 11 and 13 of a defective printhead 10 and 12 may not be deemed reliable. For example, the respective detected temperature may not have a trusted status corresponding thereto. In some examples, detected temperatures not deemed reliable may not be used to control the motion functions of the image forming system 100 and/or the motion functions may be limited. In some examples, motion functions of the image forming system 100 may include transporting media along media transport path, reciprocating printhead carriage across media transport path, and the like. In some examples, the image forming system 100 may include more than two printheads 10 and 12 at the same time. Each one of the printheads may include a respective thermal sense resistor to detect the temperature of the respective printhead and the ambient temperature of the image forming system 100. A temperature difference may be determined between each one of the respective printheads with at least another one of the printheads. The respective temperature differences may be compared with a temperature parameter to determine at least one of a potentially defective printhead and whether the respective detected temperatures may be assigned a trusted status.

Referring to FIGS. 1 and 2, in examples, the first printhead 10, the second printhead 12, the replacement printhead 24, the temperature variation module 16, the temperature comparison module 17, the status identification module 18, and the control module 26 may be implemented in hardware, software, or in a combination of hardware and software. In other examples, the first printhead 10, the second printhead 12, the replacement printhead 24, the temperature variation module 16, the temperature comparison module 17, the status identification module 18, and the control module 26 may be implemented in whole or in part as a computer program stored in the image forming system 100 locally or remotely, for example, in a memory such as a server or a host computing device considered herein to be part of the image forming system 100.

Figure 3:
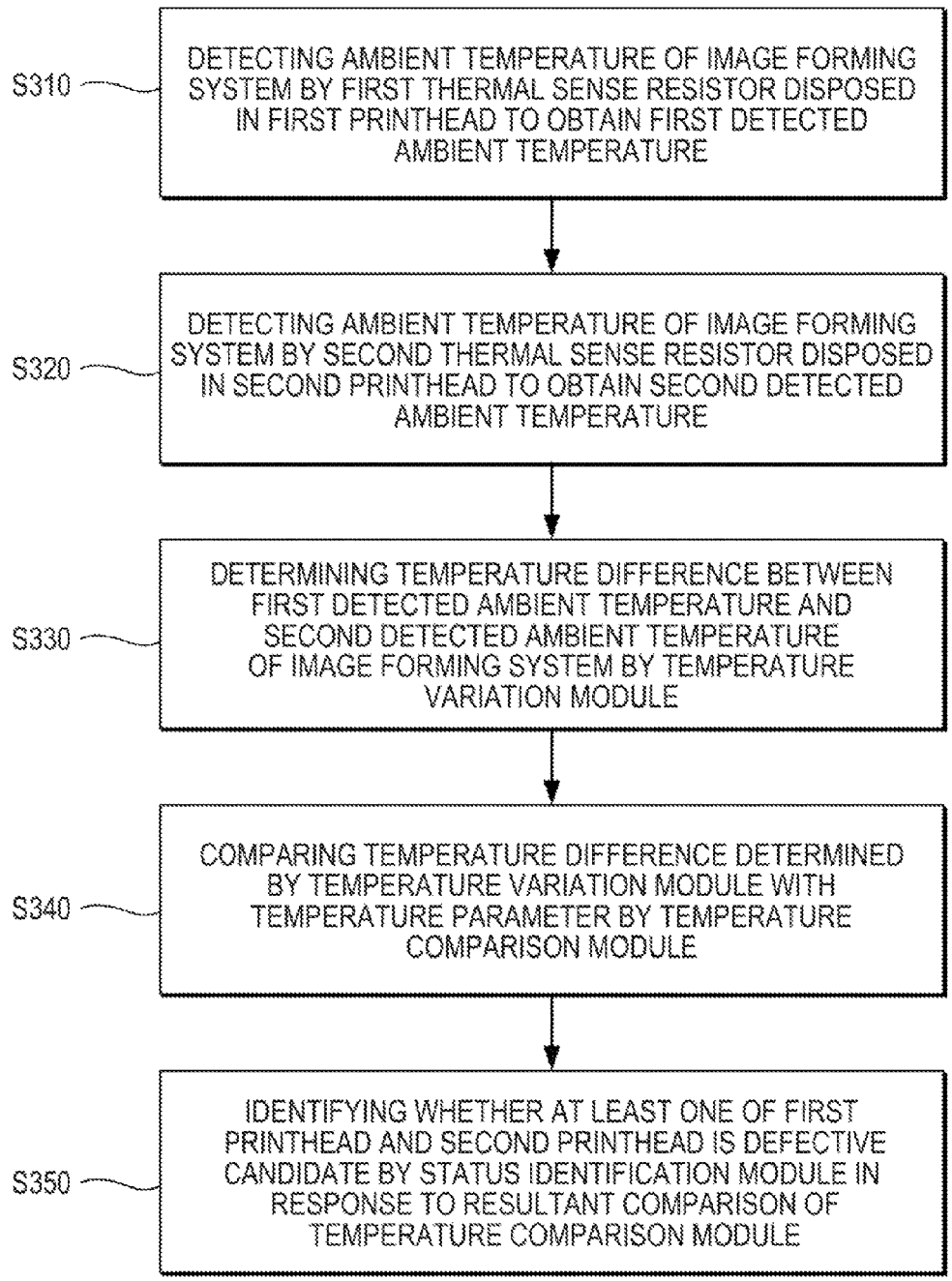
FIG. 3 is a flowchart illustrating a method of detecting defective printheads in an image forming system according to an example.

FIG. 3 is a flowchart illustrating a method of detecting defective printheads in an image forming system according to an example. Referring to FIG. 3, in block S310, an ambient temperature of an image forming system is detected by a first thermal sense resistor disposed in a first printhead to obtain a first detected ambient temperature. In block S320, the ambient temperature of the image forming system is detected by a second thermal sense resistor disposed in a second printhead to obtain a second detected ambient temperature. For example, the first and second thermal sense resistor may detect a temperature of the second printhead after a predetermined period of time to correspond with the surrounding ambient temperature. In block S330, the temperature difference is determined between the first detected ambient temperature and the second detected ambient temperature of the image forming system by a temperature variation module. In block S340, the temperature difference determined by the temperature variation module is compared with a temperature parameter by a temperature comparison module. In some examples, the temperature parameter may be in a predetermined range of three to eight degrees Celsius. For example, the temperature parameter may be eight degrees Celsius.

Referring to FIG. 3, in block S350, whether at least one of the first printhead and the second printhead is a defective candidate is identified by a status identification module in response to a resultant comparison by the temperature comparison module. For example, a non-defective status may be applied to the first printhead and the second printhead in response to the resultant comparison corresponding to the temperature difference being less than the temperature parameter. Consequently, in some examples, the first and second detected ambient temperatures detected by the respective printheads may be deemed reliable. Further, the control module may limit power to the motors to reduce damage thereto when the detected temperature of at least one of the first and second printhead and/or an average of the detected temperature of the first and second printhead is higher than normal. Alternatively, the first printhead may be identified as a defective candidate in response to the resultant comparison corresponding to the temperature difference being at least one of equal to and greater than the temperature parameter. In some examples, the control module may limit power to the motors to reduce damage thereto when at least one of the printheads is identified as a defective candidate due to the detected temperature therefrom not deemed reliable. In some examples, the defective printhead may be replaced with a replacement printhead.

In some examples, the method may also include a third thermal sense resistor disposed in a replacement printhead to replace the first printhead to detect the ambient temperature of the image forming system to obtain a third detected ambient temperature. The second thermal sense resistor disposed in the second printhead may detect the ambient temperature of the image forming system to obtain an other second detected ambient temperature. The temperature variation module may determine a subsequent temperature difference between the third detected ambient temperature and the other second detected ambient temperature. The temperature comparison module may compare the subsequent temperature difference with the temperature parameter.

The status identification module may identify whether at least the replacement printhead is a defective candidate in response to a resultant comparison of the temperature comparison module. For example, a non-defective status may be assigned to the replacement printhead and the second printhead by the status identification module in response to the resultant comparison corresponding to the temperature difference being less than the temperature parameter. Additionally, a printhead status of the second printhead may be identified in response to the resultant comparison corresponding to the subsequent temperature difference being at least one of equal to and greater than the temperature parameter. That is, the status identification module may determine whether the second printhead was previously identified as non-defective. For example, the replacement printhead may be determined a defective candidate in response to the printhead status of the second printhead identified as having the non-defective status and the second printhead may be determined as a defective candidate in response to the printhead status of the second printhead not identified as having the non-defective status. That is, the replacement printhead may be assumed to be non-defective unless the second printhead was previously identified as non-defective.

Figure 4A:
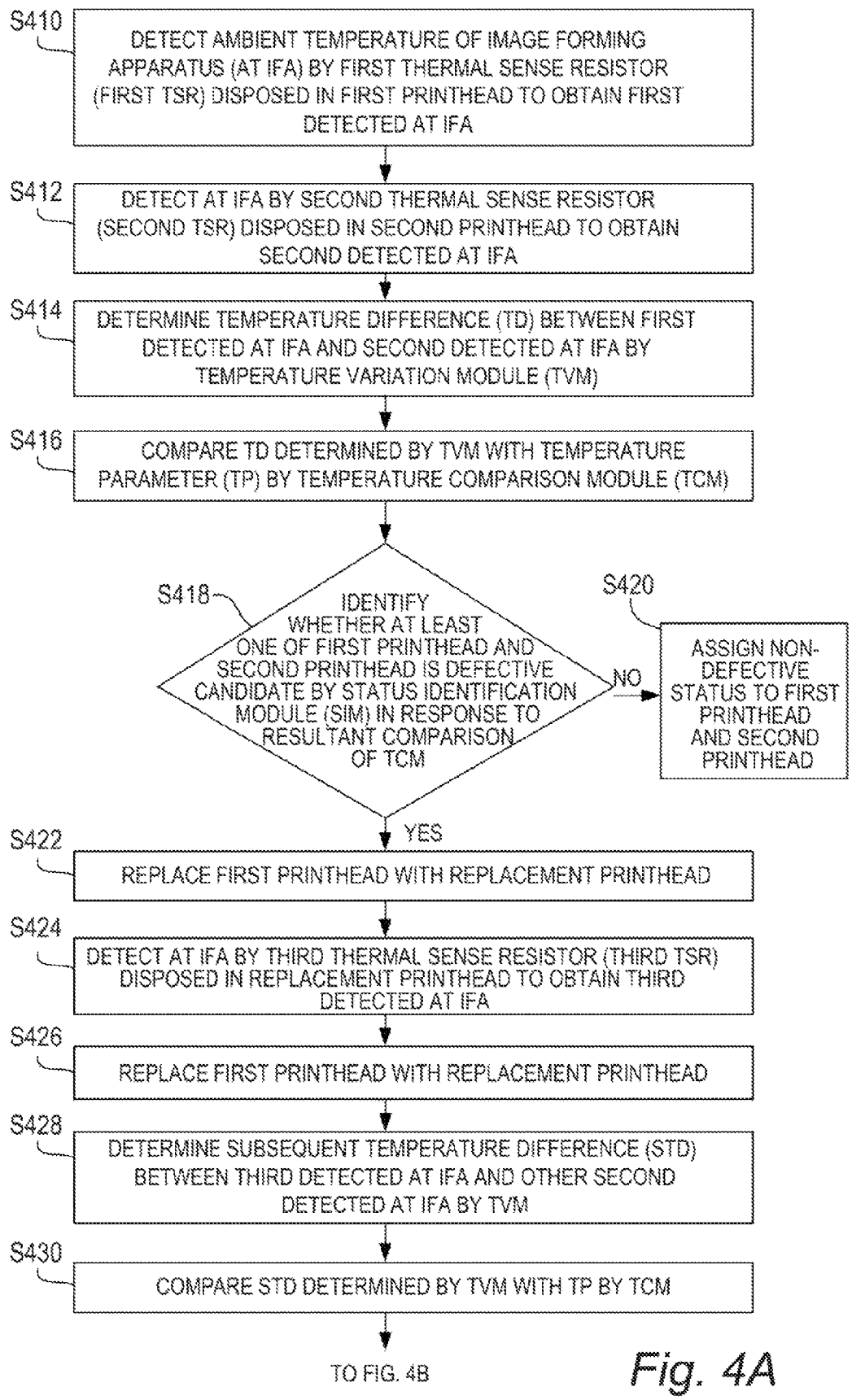
FIGS. 4A and 4B are flowcharts illustrating a method of detecting defective printheads in an image forming system according to an example.
Figure 4B:
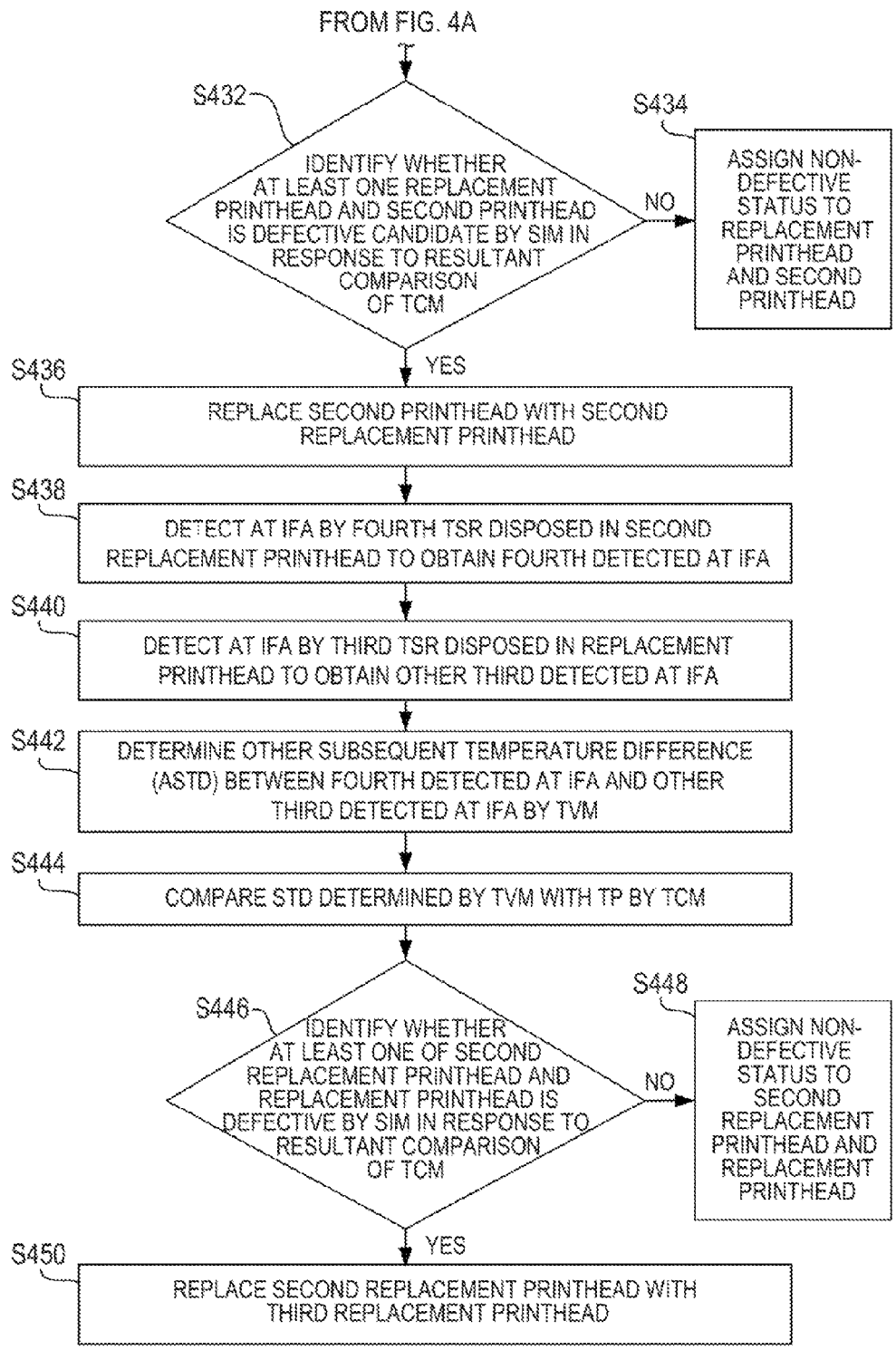

FIGS. 4A and 4B are flowcharts illustrating a method of detecting defective printheads in an image forming system according to an example. Referring to FIGS. 4A and 4B, in block S410, an ambient temperature of an image forming system is detected by a first thermal sense resistor disposed in a first printhead to obtain the first detected ambient temperature of the image forming system. In block S412, the ambient temperature of the image forming system is detected by a second thermal sense resistor disposed in a second printhead to obtain the second detected ambient temperature of the image forming system. In some examples, respective thermal sense resistors disposed in the respective printhead may detect the ambient temperature of the image forming system by detecting the respective temperature of the corresponding printhead after a predetermined period of time in which the respective printhead is in an idle state. In block S414, the temperature difference between the first detected ambient temperature and the second detected ambient temperature is determined by a temperature variation module. In block S416, the temperature difference determined by the temperature variation module is compared by the temperature comparison module with the temperature parameter.

In block S418, whether at least one of the first printhead and the second printhead is a defective status is identified by a status identification module in response to the resultant comparison of the temperature comparison module. If no, the first printhead and the second printhead are assigned a non-defective status by the status identification module as illustrated in block S420. Consequently, the first and second detected ambient temperatures detected by the respective printheads may be deemed reliable. If yes, the first printhead is replaced by the replacement printhead as illustrated in block S422. For example, a user may replace the first printhead with a replacement printhead. Consequently, in some examples, the first detected ambient temperature and the second detected ambient temperature may not be deemed reliable as the corresponding printheads do not have a non-defective status assigned therewith. In some examples, detected temperature not deemed reliable may not be used to control the motion functions of the image forming system and/or the motion functions may be limited.

In block S424, the ambient temperature of the image forming system is detected by a third thermal sense resistor disposed in the replacement printhead to obtain the third detected ambient temperature of the image forming system. In block S426, the ambient temperature of the image forming system is detected by the second thermal sense resistor to obtain an other second detected ambient temperature. In block S428, the subsequent temperature difference between the third detected ambient temperature and the other second detected ambient temperature is determined by the temperature variation module. In block S430, the subsequent temperature difference determined by the temperature variation module is compared by the temperature comparison module with the temperature parameter.

In block S432, whether at least one of the replacement printhead and the second printhead is a defective candidate is identified by the status identification module in response to the resultant comparison of the temperature comparison module. If no, the replacement printhead and the second printhead are assigned a non-defective status by the status identification module as illustrated in block S434. Consequently, the third detected ambient temperature and the other second detected ambient temperature are deemed reliable. If yes, the second printhead is replaced by the second replacement printhead as illustrated in block S436. For example, a user may replace the second printhead with the second replacement printhead. Consequently, in some examples, the third detected ambient temperature and the other second detected ambient temperature may not be deemed reliable.

In block S438, the ambient temperature of the image forming system is detected by a fourth thermal sense resistor disposed in the second printhead to obtain the fourth detected ambient temperature. In block S440, the ambient temperature is detected by a third thermal sense resistor disposed in the replacement printhead to obtain an other third detected ambient temperature of the image forming system. In block S442, another subsequent temperature difference between the fourth detected ambient temperature and the other third detected ambient temperature is determined by a temperature variation module. In block S444, the other subsequent temperature difference determined by the temperature variation module is compared by the temperature comparison module with the temperature parameter.

In block S446, whether at least one of the second replacement printhead and the replacement printhead is a defective candidate is identified by the status identification module in response to the resultant comparison of the temperature comparison module. If no, the second replacement printhead and the replacement printhead are assigned a non-defective status by the status identification module as illustrated in block S448. If yes, the second replacement printhead is replaced by a third replacement printhead as illustrated in block S450. For example, a user may replace the second replacement printhead with the third replacement printhead. Consequently, in some examples, the other third detected ambient temperature and the fourth detected ambient temperature may not be deemed reliable.

Figure 5:
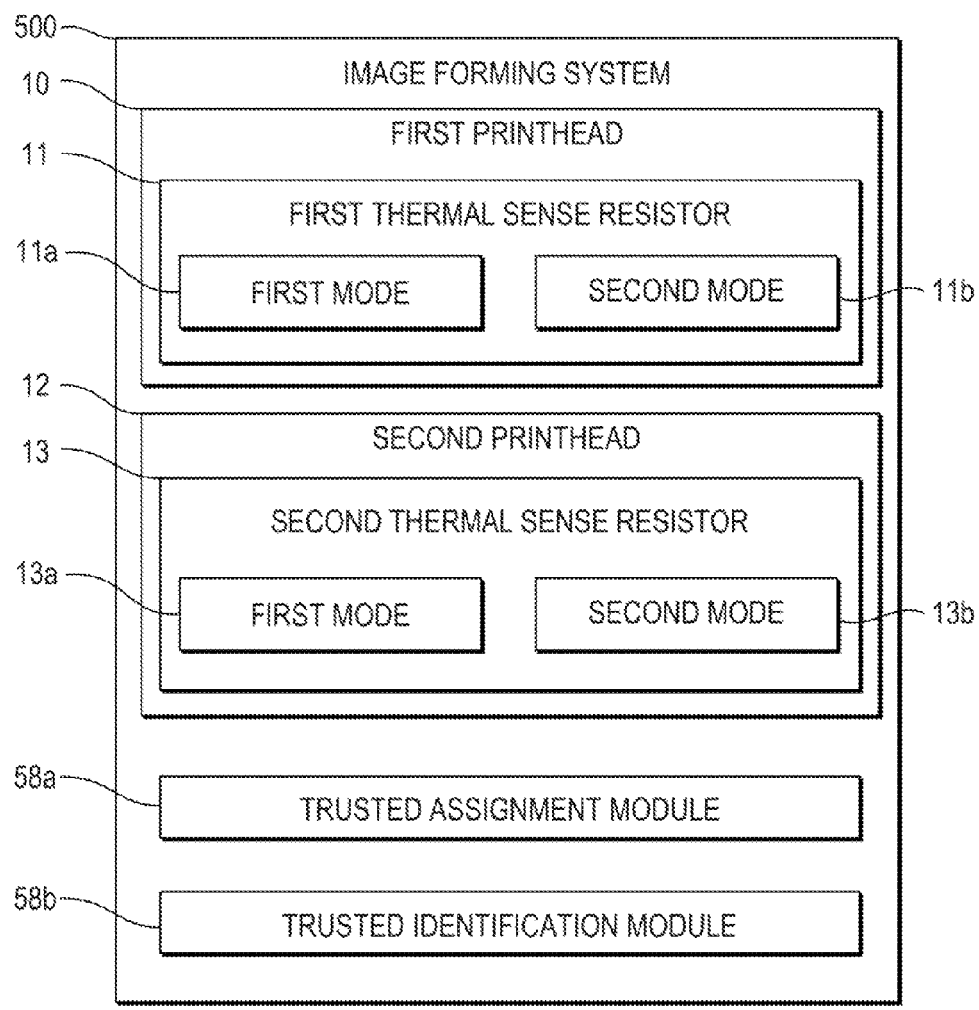
FIG. 5 is a block diagram illustrating an image forming system according to an example.

FIG. 5 is a block diagram illustrating an image forming system according to an example. Referring to FIG. 5, in some examples, an image forming system 500 includes a first printhead 10, a second printhead 12, a temperature variation module 16, a trusted assignment module 58a, a trusted identification module 58b, and a control module 56. The first printhead 10 includes a first thermal sense resistor 11 having a first mode 11a to detect a temperature of the first printhead 10 and a second mode 11b to detect an ambient temperature of the image forming system 500 to obtain a first detected ambient temperature. The second printhead 12 includes a second thermal sense resistor 13 having a first mode 13a to detect a temperature of the second printhead 12 and a second mode 13b to detect the ambient temperature of the image forming system 500 to obtain a second detected ambient temperature. In some examples, the respective ambient temperatures may be detected by the respective thermal sense resistors 11 and 13 of the respective printheads 10 and 12 after the respective printheads 10 and 12 are idle for a predetermined period of time such as thirty minutes. That is, the predetermined period of time may correspond to a sufficient amount of time for the respective printheads 10 and 12 to cool to the surrounding ambient temperature, unless the respective printheads 10 and 12 are defective. In some examples, the thermal sense resistors 11 and 13 may be embedded in the printhead silicon of the respective printhead 10 and 12.

Referring to FIG. 5, in some examples, the temperature variation module 16 may determine a temperature difference between the first detected ambient temperature and the second detected ambient temperature of the image forming system 500. The trusted assignment module 58a may assign a trusted status to correspond with the first detected ambient temperature and the second detected ambient temperature in response to the temperature difference determined to be within a predetermined range. For example, the trusted assignment module 58a may store the trusted status in firmware, and the like, to correspond with the respective detected ambient temperatures. In some examples, the predetermined range may be from zero to five degrees Celsius. For example, the temperature difference may be two degrees Celsius. The trusted identification module 58b may identify whether the first detected ambient temperature and the second detected ambient temperature has the trusted status assigned thereto. The control module 56 may control a motion function of the image forming system 500 based on an identification by the trusted identification module 58b that the trusted status has been applied to the first detected ambient temperature and the second detected ambient temperature. In some examples, detected temperatures not assigned the trusted status may not be used to control the motion functions of the image forming system 500 and/or the motion functions may be limited. At least one of the first printhead 10 and the second printhead 12 may be replaced based on the identification that the trusted status has not been applied to the first detected ambient temperature and the second detected ambient temperature. That is, generally the first detected ambient temperature and the second detected ambient temperature should not vary substantially in order to be trusted.

Referring to FIG. 5, in examples, the first printhead 10, the second printhead 12, the temperature variation module 16, the trusted assignment module 58a, the trusted identification module 58b, and the control module 56 may be implemented in hardware, software, or in a combination of hardware and software. In other examples, the first printhead 10, the second printhead 12, the temperature variation module 16, the trusted assignment module 58a, the trusted identification module 58b, and the control module 56 may be implemented in whole or in part as a computer program stored in the image forming system 500 locally or remotely, for example, in a memory such as a server or a host computing device considered herein to be part of the image forming system 500.

Figure 6:
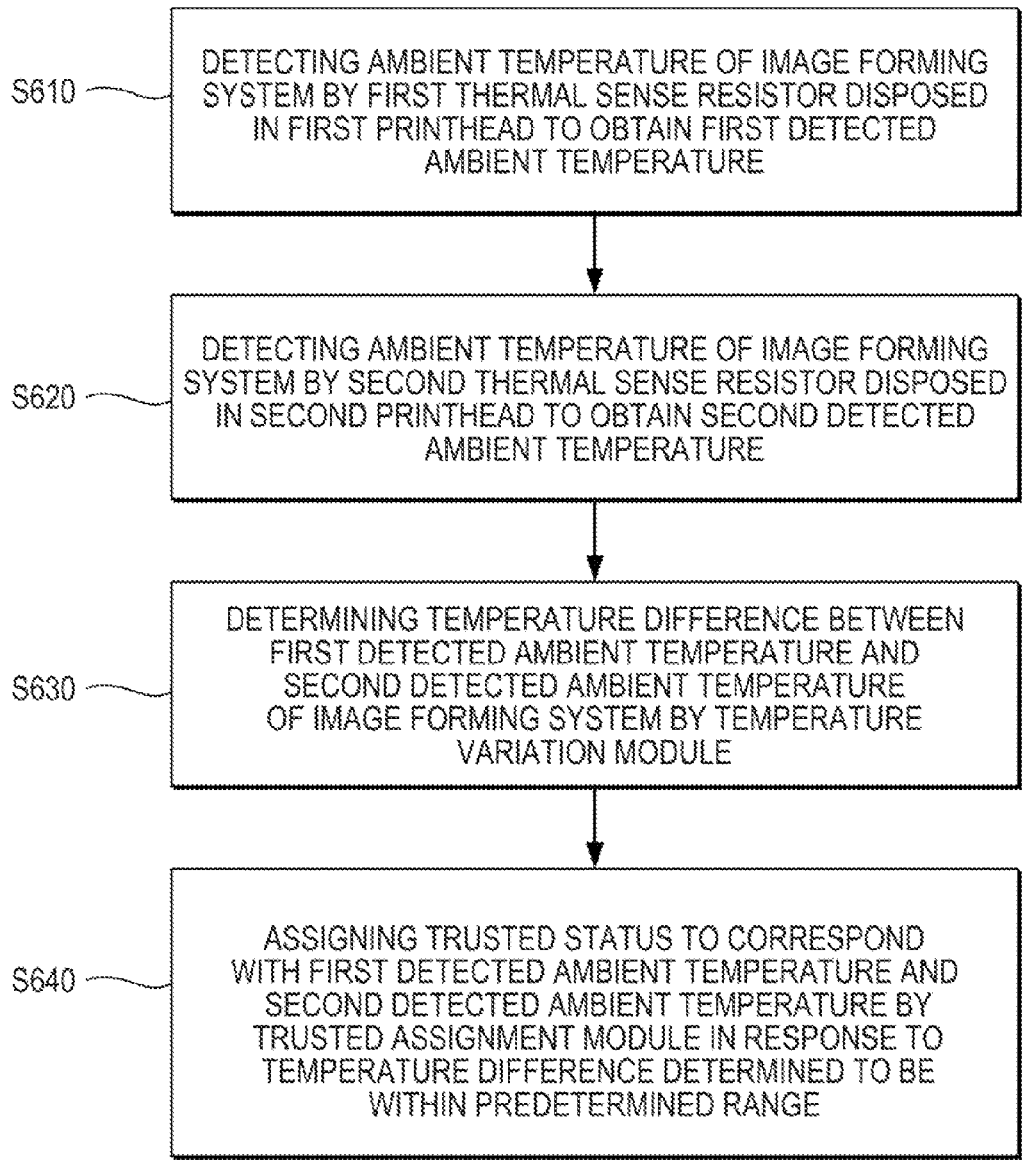
FIG. 6 is a flowchart illustrating a method of verifying accuracy of detected temperatures by respective printheads in an image forming system having a plurality of printheads according to an example.

FIG. 6 is a flowchart illustrating a method of verifying accuracy of detected temperatures by respective printheads in an image forming system having a plurality of printheads according to an example. Referring to FIG. 6, in block S610, an ambient temperature of an image forming system is detected by a first thermal sense resistor disposed in a first printhead to obtain a first detected ambient temperature. In block S612, the ambient temperature of the image forming system is detected by a second thermal sense resistor disposed in a second printhead to obtain a second detected ambient temperature. For example, the first and second thermal sense resistor may detect a temperature of the second printhead after a predetermined period of time to correspond with the surrounding ambient temperature. In block S614, a temperature difference between the first detected ambient temperature and the second detected ambient temperature of the image forming system is determined by a temperature variation module.

In block S616, a trusted status to correspond with the first detected ambient temperature and the second detected ambient temperature is assigned by a trusted assignment module in response the temperature difference determined to be within a predetermined range of zero to three degrees Celsius. For example, the temperature difference may be two degrees Celsius. In some examples, the method may also include identifying whether the first detected ambient temperature and the second detected ambient temperature has the trusted status assigned thereto by a trusted identification module. For example, a control module may control motion functions of the image forming system based on identification by the trusted identification module that the trusted status has been applied to the first detected ambient temperature and the second detected ambient temperature. Alternatively, at least one of the first printhead and the second printhead is replaced, for example, by a user, based on the identification that the trusted status has not been applied to the first detected ambient temperature and the second detected ambient temperature.

It is to be understood that the flowcharts of FIGS. 3-4B and 6 illustrate an architecture, functionality, and operation of an example of the present disclosure. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowcharts of FIGS. 3-4B and 6 illustrate a specific order of execution, the order of execution may differ from that which is depicted. For example, the order of execution of two or more blocks may be scrambled relative to the order illustrated. Also, two or more blocks illustrated in succession in FIGS. 3-4B and 6 may be executed concurrently or with partial concurrence. All such variations are within the scope of the present disclosure.

What is claimed is:

1. A method of detecting defective printheads in an image forming system, the method comprising:
    detecting an ambient temperature of an image forming system by a first thermal sense resistor disposed in a first printhead to obtain a first detected ambient temperature;
    detecting the ambient temperature of the image forming system by a second thermal sense resistor disposed in a second printhead to obtain a second detected ambient temperature;
    determining a temperature difference between the first detected ambient temperature and the second detected ambient temperature of the image forming system by a temperature variation module;

comparing the temperature difference determined by the temperature variation module with a temperature parameter by a temperature comparison module; and identifying whether at least one of the first printhead and the second printhead is a defective candidate by a status identification module in response to a resultant comparison of the temperature comparison module.

2. The method according to claim 1, wherein the temperature parameter is in a predetermined range of three to eight degrees Celsius.

3. The method according to claim 2, wherein the temperature parameter is eight degrees Celsius.

4. The method according to claim 1, wherein the identifying whether at least one of the first printhead and the second printhead is a defective candidate further comprises:

identifying the first printhead as the defective candidate in response to the resultant comparison corresponding to the temperature difference being at least one of equal to and greater than the temperature parameter.

5. The method according to claim 4, further comprising:

detecting the ambient temperature of the image forming system by a third thermal sense resistor disposed in a replacement printhead to replace the first printhead to obtain a third detected ambient temperature;

detecting the ambient temperature of the image forming system by the second thermal sense resistor disposed in the second printhead to obtain an other second detected ambient temperature;

determining a subsequent temperature difference between the third detected ambient temperature and the other second detected ambient temperature by the temperature variation module;

comparing the subsequent temperature difference with the temperature parameter by the temperature comparison module; and identifying whether at least the replacement printhead is a defective candidate by the status identification module in response to a resultant comparison of the temperature comparison module.

6. The method according to claim 5, wherein the identifying whether at least the replacement printhead is a defective candidate by the status identification module in response to a resultant comparison of the temperature comparison module further comprises:

assigning a non-defective status to the replacement printhead and the second printhead by the printhead identification module in response to the resultant comparison corresponding to the temperature difference being less than the temperature parameter.

7. The method according to claim 5, wherein the identifying whether at least the replacement printhead is a defective candidate by the status identification module in response to a resultant comparison of the temperature comparison module further comprises:

identifying a printhead status of the second printhead in response to the resultant comparison corresponding to the subsequent temperature difference being at least one of equal to and greater than the temperature parameter such that:

determining the replacement printhead is the defective candidate in response to the printhead status of the second printhead identified as having the non-defective status; and determining the second printhead is the defective candidate in response to the printhead status of the second printhead not identified as having the non-defective status.

8. The method according to claim 1, wherein the identifying whether at least one of the first printhead and the second printhead is a defective candidate further comprises:

assigning a non-defective status to the first printhead and the second printhead in response to the resultant comparison corresponding to the temperature difference being less than the temperature parameter.

9. An image forming system, comprising:

a first printhead including a first thermal sense resistor having a first mode to detect a temperature of the first printhead and a second mode to detect an ambient temperature of the image forming system to obtain a first detected ambient temperature;

a second printhead including a second thermal sense resistor having a first mode to detect a temperature of the second printhead and a second mode to detect the ambient temperature of the image forming system to obtain a second detected ambient temperature;

a temperature variation module to determine a temperature difference between the first detected ambient temperature and the second detected ambient temperature of the image forming system;

a temperature comparison module to compare the temperature difference with a temperature parameter; and a status identification module to identify whether at least one of the first printhead and the second printhead is a defective candidate based on a resultant comparison by the temperature comparison module.

10. The image forming system according to claim 9, wherein the status identification module identifies at least one of the first printhead and the second printhead as defective based on the resultant comparison corresponding to the temperature difference being at least one of equal to and greater than the temperature parameter; and wherein the status identification module assigns a non-defective status to the first printhead and the second printhead based on the resultant comparison corresponding to the temperature difference being less than the temperature parameter.

11. The image forming system according to claim 10, further comprising:

a replacement printhead to replace the at least one of the first printhead and the second printhead determined to be a defective candidate by the status identification module, the replacement printhead having a first mode to detect a temperature of the replacement printhead and a second mode to detect the ambient temperature of the image forming system to obtain a third detected ambient temperature; and wherein the status identification module identifies whether the replacement printhead is the defective candidate.

12. The image forming system according to claim 9, further comprising:

a control module to control a motion function of the image forming system based on a respective detected temperature of at least one of the first printhead and the second printhead; and wherein the temperature parameter is in a predetermined range of three to eight degrees Celsius.

13. A method of verifying accuracy of detected temperatures by respective printheads in an image forming system having a plurality of printheads, the method comprising:

detecting an ambient temperature of an image forming system by a first thermal sense resistor disposed in a first printhead to obtain a first detected ambient temperature;

detecting the ambient temperature of the image forming system by a second thermal sense resistor disposed in a second printhead to obtain a second detected ambient temperature;

determining a temperature difference between the first detected ambient temperature and the second detected ambient temperature of the image forming system by a temperature variation module; and assigning a trusted status to correspond with the first detected ambient temperature and the second detected ambient temperature by a trusted assignment module in response the temperature difference determined to be within a predetermined range.

14. The method according to claim 13, further comprising:

identifying by a trusted identification module whether the first detected ambient temperature and the second detected ambient temperature has the trusted status assigned thereto such that a control module controls motion functions of the image forming system based on an identification by the trusted identification module that the trusted status has been applied to the first detected ambient temperature and the second detected ambient temperature.

15. The method according to claim 14, further comprising:

identifying by the trusted identification module whether the first detected ambient temperature and the second detected ambient temperature has the trusted status assigned thereto such that at least one of the first printhead and the second printhead is replaced based on the identification that the trusted status has not been applied to the first detected ambient temperature and the second detected ambient temperature.

* * * * *